No. 800,575. PATENTED SEPT. 26, 1905.
J. HICKEY.
CHAIN.
APPLICATION FILED MAY 29, 1905.
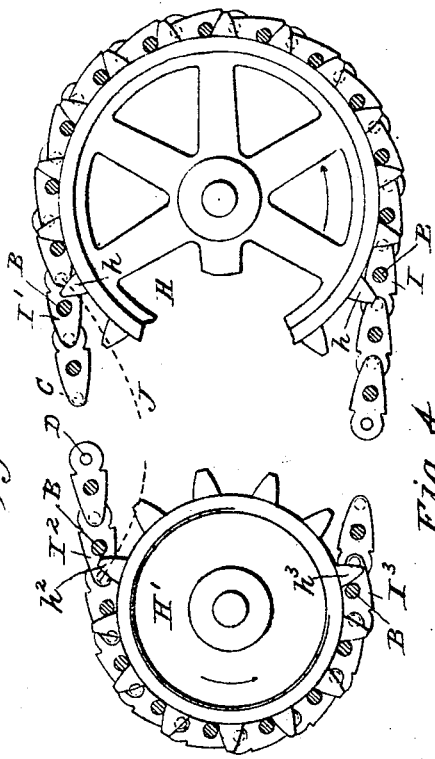
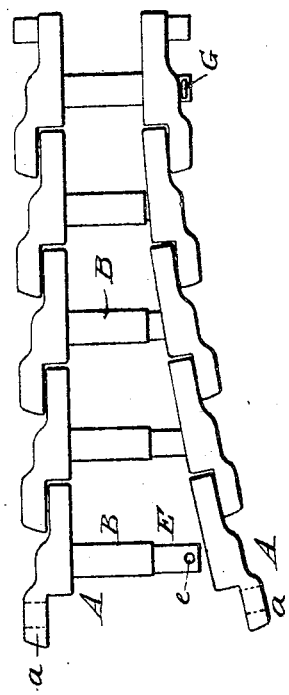
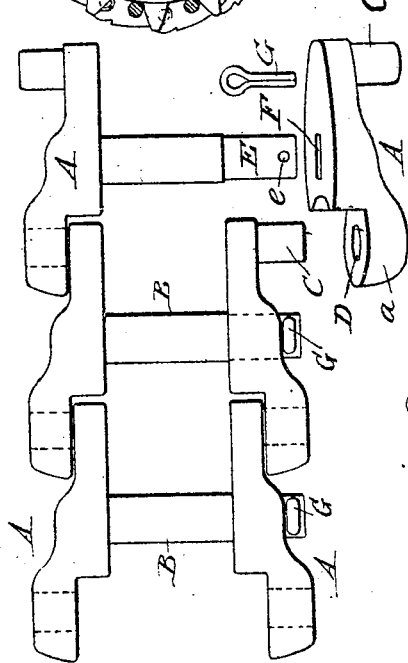
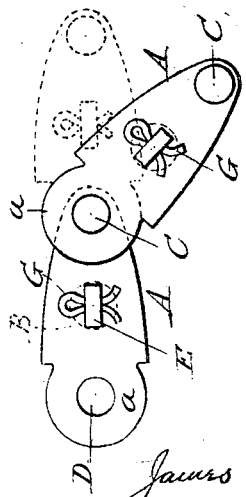
Witnesses
Auguste J. Lix.
N. Curtis Lammond
Inventor
James Hickey,
H. H. Bliss
Attorney

UNITED STATES PATENT OFFICE.

JAMES HICKEY, OF PRETTY PRAIRIE, KANSAS.

CHAIN.

No. 800,575.  Specification of Letters Patent.  Patented Sept. 26, 1905.

Application filed May 29, 1905. Serial No. 262,874.

*To all whom it may concern:*

Be it known that I, JAMES HICKEY, a citizen of the United States, residing at Pretty Prairie, in the county of Reno and State of Kansas, have invented certain new and useful Improvements in Chains, of which the following is a specification, reference being had therein to the accompanying drawings.

This invention relates to improvements in chains of the class known as "drive-chains," made of duplicate separable links.

The object is to provide a chain superior to those heretofore known in several respects, and particularly in having its links formed of parts so constructed and related that they can engage with and disengage from sprocket-wheels smoothly and without friction.

Figure 1 is a plan view of a part of a chain embodying my improvements. Fig. 2 is a side view of a pair of wheels having a chain applied thereto of my improved form. Fig. 3 shows two adjacent links at an angle to each other. Fig. 4 is a plan view illustrating the manner in which the elements of the link may be detached from each other for the purpose of inserting a new link.

The chain is formed of a series of articulated links, each formed of a pair of side bars A A and a connecting cross-bar B. The cross-bars lie between the spaces through which the teeth of the sprocket-wheels extend and serve as the bearing members of the chain with which the sprocket-teeth engage. My chain differs in several respects from the various styles of sprocket or drive chains now in common use, one difference being that the cross-bars are situated intermediate the joints or axes of articulation of the chain-links.

I prefer that the cross-bar B should be integral with one of the side bars and separable from the other, as represented in the drawings, though this is an incidental feature of construction and not necessary to carry out my invention. When thus constructed, the outer end of the cross-bar is preferably reduced in size, as indicated at E, and of a shape in cross-section other than round, so that when inserted into the correspondingly-shaped aperture F in the opposite side bar designed to receive it it will prevent the turning of one side bar relatively to the other. I have represented the end E of the cross-bar as being rectangular in cross-section. It is of a length to extend entirely through the side bar A and project a little beyond its outer face in order to permit a secure connection with such side bar. This may be effected by means of a split key G, that is passed through an aperture $e$, formed near the end of the reduced portion of the cross-bar. When the parts of the link, the two side bars, and the cross-bar are thus united, they constitute a rigid structure.

The links of the chain may be pivotally connected in any suitable way. I prefer that the connection should be such as to permit the easy separation of any link from its neighbors, and for that purpose I have adopted the construction which I now describe.

Each of the side bars is provided at one end of the link with a short transversely-extending pintle C, that is adapted to enter and articulate within an aperture or bearing D, formed in one end of a side bar of an adjacent link. In order that the side bars A of adjacent links may lie in line with each other, each of them has one of its ends offset, as indicated at $a$, to overlap the end of the side bar of the link to which it is connected. I have represented the apertures D as being formed in the offset portions of the side bars.

The means for connecting or coupling together the links permit the ready separating and uniting thereof, both when building up the chain and when it is necessary at any time to shorten it or lengthen it or to substitute a new link or links. This is illustrated in Fig. 4, which shows a section of the chain with the side bars of one line or set of side bars in the positions which they assume when a link is to be taken out or another is to be inserted. The cotter keys or fasteners G of three or four of the links are withdrawn, and this permits a short series of side bars to be moved out of their normal positions sufficiently far to free entirely the parts constituting the link at the place where the chain is to be opened. After being thus freed this link can be taken out and the two adjacent ones can be coupled or one or more new ones can be inserted and the parts again put into proper relative position.

It will be apparent from an examination of Fig. 3 that whenever the chain is bent, as in passing around a sprocket-wheel, the distance between the cross-bars of the adjacent links is less than when those links are in line with each other—that is, when the chain is straightened out. This causes the chain to run with less friction when in engagement with a sprocket-wheel than does a chain of the type in which the cross-bars with which the sprocket-teeth engage are each concentric with a joint or axis of articulation. It will be seen by reference to Fig. 2 that as a link (for example, link I) of the chain approaches the driving sprocket-wheel H its cross-bar B comes into engagement with the wheel-rim and with the sprocket $h$ of the wheel at the same time, the wheel being in rotation and causing this link to rock in relation to the link in advance, the cross-bar B being consequently drawn forward slightly, bringing it into close engagement with the farther or advance side of the sprocket near its base or where it unites with the rim of the wheel. Then, as will be seen by considering the chain at the top of the driving-wheel H, the link at I', as it commences to leave the wheel, swings its cross-bar B forward relatively away from the front face of its driving-sprocket $h$ because of the rapidly-increasing distance between its cross-bar or pintle B and that of the next following link.

Referring to the driven wheel H' and the adjacent part of the chain above and approaching it, the link I², as will be seen, has its cross-bar or pintle B come into contact with the wheel-rim just a little before the link is bent relatively to the link in advance to correspond with or fit the circumference of the wheel-rim, and then the cross-bar is caused to come into close engagement with the near or rear side of the sprocket-tooth by reason of the further bending of the link as it and the link in advance take the curve of the wheel, and at the same time the link I³ as it leaves the driven wheel H' causes its pintle B to swing outward (relatively to the wheel H') free of the sprocket $h^3$ in advance of it.

A chain of this character works with very little friction and without danger of the links running off the sprocket-wheels, for, as described, the cross-bars of the moving links seat themselves in their correct working positions upon both the driving and the driven sprocket-wheels and leave those wheels without being forcibly slid over the faces of the sprocket-teeth, which always causes friction and frequently causes the chain to climb up the sprocket and finally run off the wheel. A chain of this character can have the slack side very loose, as indicated by the dotted lines at J in Fig. 2, there being under such circumstances, as is well known, a marked reduction of the friction incident to such an apparatus. Again, a chain of this character can be run in either direction with equal efficiency.

What I claim is—

1. A drive-chain formed of duplicate links each articulated to the next, and each having a pair of side bars and a sprocket-engaging cross-bar, the cross-bar of each link being intermediate of the axis of its articulations with the next link, substantially as set forth.

2. A drive-chain formed of separable duplicate links, each link having a pair of side bars and having means near its ends for articulating with another link and having a sprocket-engaging cross-bar extending from one side bar to the other and situated approximately midway between the ends of the side bars, substantially as set forth.

3. A chain comprising two lines of independent side bars, the side bars of each line being articulated to each other, and means independent of the articulated parts of the side bars for connecting the two lines thereof to each other, substantially as set forth.

4. A chain comprising two lines of independent side bars, the side bars of each line being articulated to each other, the lines of side bars being normally parallel but capable of movement toward and from each other, and cross-bars detachably connecting the side bars together for holding them parallel to each other, substantially as set forth.

5. A chain comprising a line of side bars along one side thereof having joints by which they are united, another line of side bars parallel with the first, and along the other side of the chain, and having joints uniting them to each other, the joints of the side bars at the opposite sides of the chain being directly opposite to and entirely independent of each other, and cross-bars connecting the two lines of side bars, substantially as set forth.

6. A drive-chain formed of duplicate links each adapted to engage with a wheel-tooth, each articulated directly to the next, and each formed with two separable side bars, one of said side bars having integral therewith a cross-bar adapted to engage with a wheel-tooth and to be detachably connected with the opposite side bar, said cross-bar being situated on lines intermediate of the axes of articulation of its link, substantially as set forth.

7. A chain-link having a side bar A formed with an outwardly-turned pintle at one end and a corresponding pintle-aperture at the other end, and an opposite side bar formed with an outwardly-turned pintle at one end and a correspondingly-shaped aperture at the other end, and a sprocket-engaging cross-bar B adapted to detachably connect together the two side bars, substantially as set forth.

In testimony whereof I affix my signature in presence of two witnesses.

JAMES HICKEY.

Witnesses:
J. H. SIEBERT,
JOHN ROBERTS.